United States Patent [19]

Curti

[11] 4,453,873
[45] Jun. 12, 1984

[54] AUTOMATIC SUPPORTING PLATE LOADER

[76] Inventor: Ezio Curti, Viale Regina Giovanna, 38, 20100 - Milan, Italy

[21] Appl. No.: 476,547

[22] Filed: Mar. 18, 1983

Related U.S. Application Data

[63] Continuation-in-part of Ser. No. 357,215, Mar. 11, 1982, abandoned.

[51] Int. Cl.³ .................................................. B65G 59/02
[52] U.S. Cl. ................................... 414/120; 221/220; 221/224; 271/10; 271/18; 294/67 BB; 294/81 R; 414/118
[58] Field of Search ............... 414/69, 71, 112, 117, 414/118, 120, 123, 900; 271/10, 18, 19, 24, 25, 192; 221/210, 220, 224; 294/67 R, 67 BB, 81 R, 81 SF

[56] References Cited

U.S. PATENT DOCUMENTS

| | | | |
|---|---|---|---|
| 2,217,983 | 10/1940 | Hopkins | 414/118 X |
| 2,320,094 | 5/1943 | Nash | 271/192 X |
| 2,628,726 | 2/1953 | Van Schie | 221/210 |
| 2,656,048 | 10/1953 | Samler | 414/120 |
| 3,083,963 | 4/1963 | Bardy | 414/120 |
| 3,140,088 | 7/1964 | Sykes | 271/18 X |
| 3,610,451 | 10/1971 | Bevan | 414/117 |
| 3,890,185 | 6/1975 | Umazume | 414/120 |
| 4,079,846 | 3/1978 | Tsuruta | 414/120 |
| 4,153,240 | 5/1979 | Gouley | 414/120 |
| 4,193,726 | 3/1980 | Spengler | 414/117 |

FOREIGN PATENT DOCUMENTS

| | | | |
|---|---|---|---|
| 2402701 | 8/1974 | Fed. Rep. of Germany | 414/117 |
| 2313598 | 9/1974 | Fed. Rep. of Germany | 414/120 |
| 186370 | 10/1966 | U.S.S.R. | 198/624 |
| 493423 | 2/1976 | U.S.S.R. | 294/67 BB |

*Primary Examiner*—Leslie J. Paperner
*Attorney, Agent, or Firm*—Roylance, Abrams, Berdo & Goodman

[57] ABSTRACT

A loader for automatically supplying printed circuit supporting plates to a laminator where, above the stack of supporting plates, is provided a support moving to and fro in vertical direction relative to the plate stack, with the said support being fitted with two parallel running, horizontal guide rods having at their opposite ends cylinder-piston groups whose rods support parallel and horizontal ledgers, the free ends of which are equipped with gripping elements that can be displaced horizontally as well as vertically and are provided, in parallel to each horizontal ledger receiving the gripping elements, with a driven roller runway movable in the horizontal plane from a rest position to an operating position, in which it receives the plates having in precedence been collected by the gripping elements from the pile.

13 Claims, 13 Drawing Figures

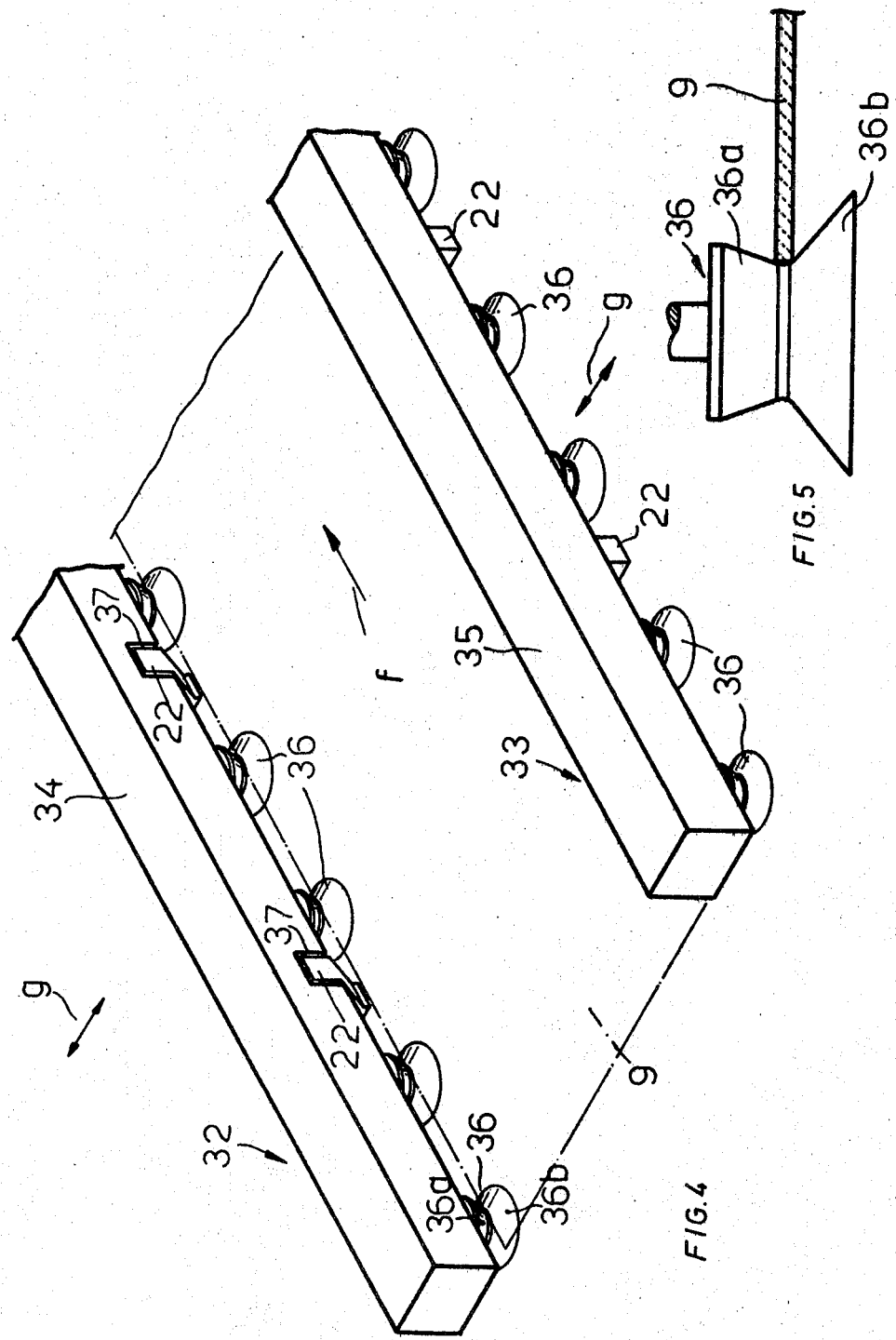

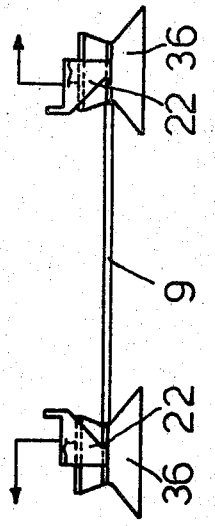
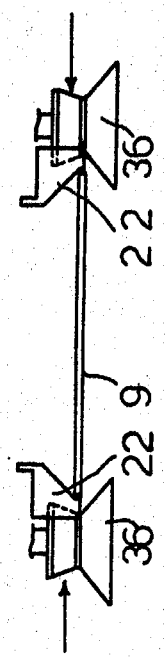
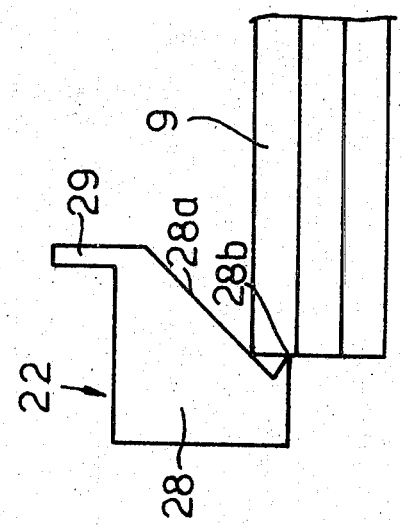
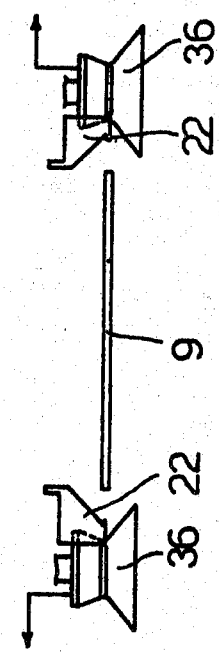

AUTOMATIC SUPPORTING PLATE LOADER

This application is a continuation-in-part of Ser. No. 357,215, filed Mar. 11, 1982, and now abandoned.

DESCRIPTION OF THE INVENTION

This invention relates to a loader for automatically supplying supporting plates for printed circuits to the in-line laminating device.

It is known that the supporting plates for printed circuits, after having been subjected to a washing and drying process and after having been stacked, have to be supplied to a laminating machine for being provided with a thin film required for the known photoresist process.

Those skilled in the art know that the transfer of the printed circuit supporting plates from the stack to the laminating machine is rather difficult due to the fact that the very delicate surfaces of the washed and dried supporting plates shall not be mechanically stressed nor present scratches or marks of any kind, shall not be touched with the naked hand nor taken up with the help of elastic suckers which may form haloes or, in general, contaminated zones, more or less large, in all resulting in very serious defects preventing the safe application of the film in the laminating machine.

For this reason, still today, the said supporting plates are supplied in a perfectly climatized ambient, by manual labour using protection gloves for feeding the plates to the laminating machine. This type of manually feeding the plates obviously does not satisfy the needs of an advanced large batch production, while the continuous cleaning of the climatized working rooms as well as their conditioning requires huge investments and while the use of protection gloves, generally in cotton, still does not save supporting plates from being damaged with threads or fibres of cotton remaining attached thereto, thus rendering the plate useless for the application of the photosensitive film inside the lamination machine.

It is the purpose of this invention to obviate the drawbacks and flaws of the previous state of the art by proposing a device which, without coming into contact with the surface of the stacked supporting plates, allows to feed the latter quickly and automatically and with high accuracy and safety to the laminating machine.

This purpose is attained according to this invention by providing on top of and over the stack of supporting plates a support capable to move to and fro vertically to the plate stack, with the said support being provided with two parallel and horizontal guide rods having at their opposite ends cylinder-piston groups whose rods carry parallel and horizontally arranged ledgers, the free ends of which are fitted with horizontally or vertically displaceable gripping elements and that, parallel to each horiontal ledger receiving the gripping elements, there is provided a drive roller runway movable in a horizontal plane from a rest position to an operating position in which it receives the plates previously collected by the gripping elements from the stack. Preferably the gripping elements are interlinked with two parallel sides of the supporting plate. It is particular advantageous to have the said griping elements supported by a horizontal guide and by a vertical guide, to have the said guides being interlinked with spring means opposing the horizontal movement and the vertical movement of the gripping elements when the latter come into contact with the sides of the plate.

A still further advantage is that the main body of the gripping element presents on the side turned toward the panel to be gripped an inclined plane allowing it to contact the upper edge of the plate and that the lower end of this inclined plane is provided with a pointed projection for locking the plate more or less at the middle of its vertical edge defining the thickness of the supporting plate. Further advantages of this invention can be obtained from the following description, claims and accompanying drawings.

The object of this invention shall now be described in detail according to an embodiment thereof given by way of example without being limited thereto and on hand of the accompanying drawings in which:

FIG. 4 shows schematically the roller runways interlinked with the gripping groups;

FIGS. 5 to 12 show schematically the various phases of functioning of the gripping groups as well as the roller runways for gripping and conveying the supporting plate; and FIG. 13 shows schematically a detail of the gripping element with the inclined plane resting against the upper edge of the plate, as well as the pointed projection engaging the corresponding vertical edge.

Figure 1:
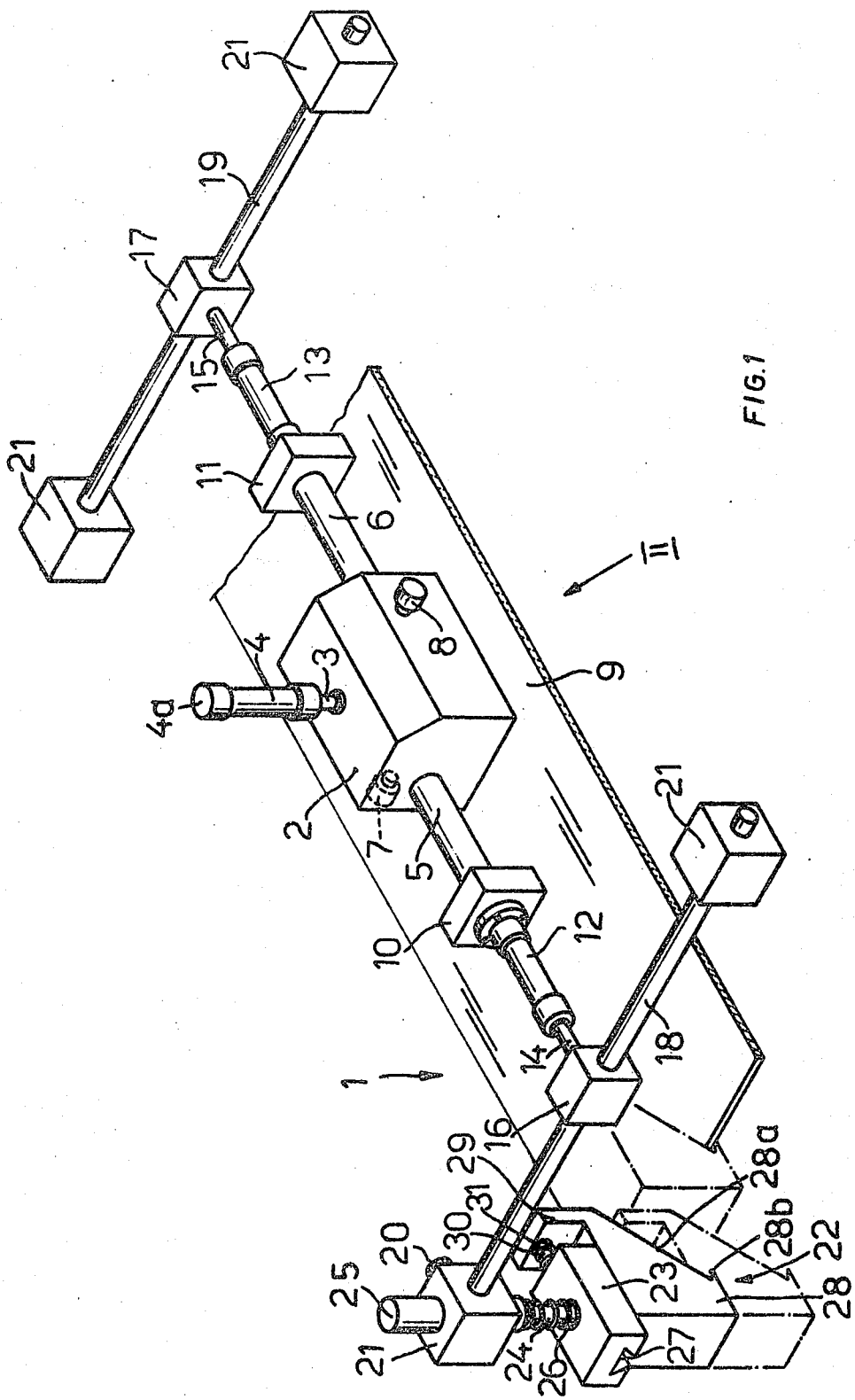
FIG. 1 is a perspective view showing schematically the gripping group.

As shown in FIG. 1, the device according to this invention, indicated as such by 1, consists of a supporting body 2, functionally connected to a rod 3 of a pneumatic cylinder 4 or the like, whose end 4a is integral part of a supporting frame not shown.

The supporting body 2 receives in suitable horizontal parallel holes guiding rods 5 and 6 which may be displaced relative to the supporting body 2 and locked in the desired position for example by means of screw knobs 7 and 8. The possibility of allowing to displace the rods 5 and 6 is useful for registering and positioning according to the dimensions of the supporting plate 9 to be gripped. At their ends the adjustable rods 5 and 6 are provided with a thickening 10, 11, for receiving the flange of a cylinder-piston group 12, 13. The rods 14, respectively 15 of the cylinder-piston groups 12, 13, are integrally connected to further supports 16, 17 which receive a corresponding cross-rod 18, respectively 19 running horizontally which cross-rods receive adjustably and for example fixed with locking screws 20, supporting blocks 21. It being possible to move the supporting blocks 21 along the cross-pieces 18, 19, we can adjust still further these supports 21 according to the size of the plate 9. Each support 21 is fitted with a gripping unit indicated in FIG. 1 by 22. In this FIG. 1, for purposes of clearness, only one gripping unit 22 is shown, it being understood that all the supports 21 are fitted each with such a gripping unit 22.

The gripping unit 22, as shown in detail in FIG. 1, consists essentially of a supporting plate 23 sliding thanks to a vertical stem 24 in a guiding sleeve 25 vertically seated in the supporting block 21. A pressure spring 26 is provided between the sliding sleeve 25 and the supporting plate 23 allowing the latter to move vertically overcoming the force of the spring 26. The supporting plate 23 has perferably a dovetailed groove 27 at the lower side in which moves a shaped profile integral part of the proper gripping means 28. This gripping means 28 has at the front side a vertical plate 29 with a stem 30 slidably guided in the horizontal plate 23 and provided still further between the supporting plate 23 and the vertical plate 29 with a pressure spring 31, thereby allowing the gripping means 28 to move horizontally against the force of the spring 31.

On the front side of the gripping means 28 is provided an inclined plane 28a ending at the bottom in a pointed projection 28b. The meanings of these two elements shall be explained in more detail hereinafter.

Figure 2:
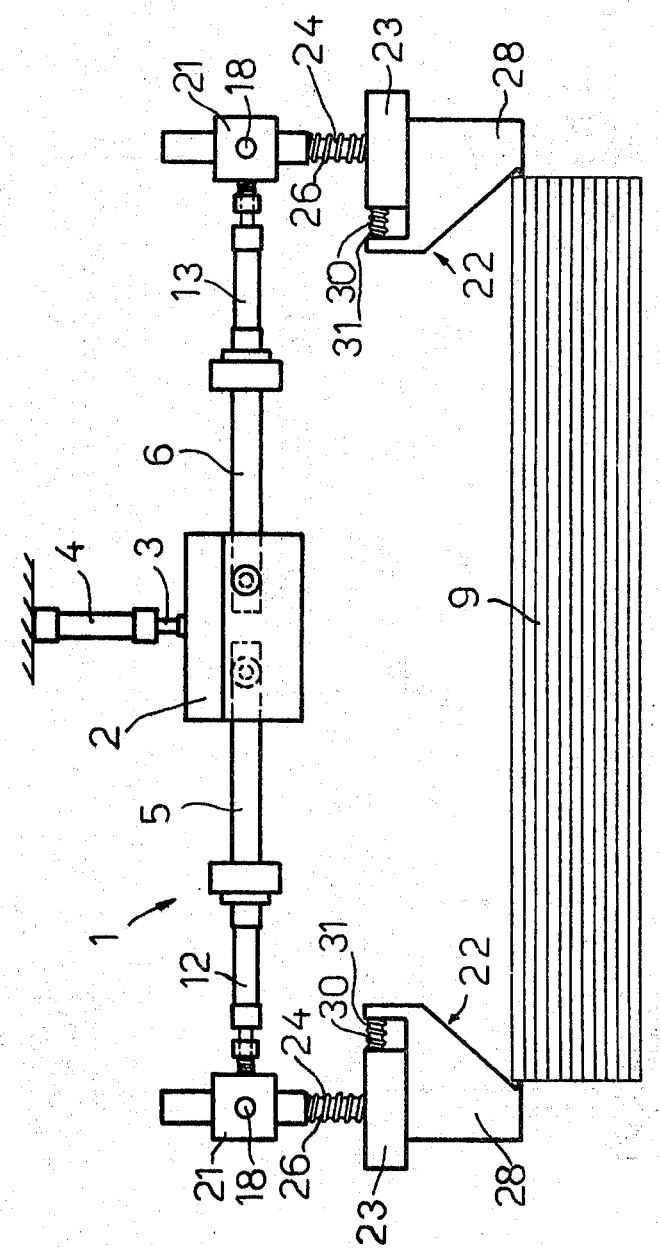
FIG. 2 is a front view of the gripping group according to the arrow II of FIG. 1.

FIG. 2 essentially shows the means already described in FIG. 1 but making still clearer the position of the gripping element 1 with respect to the supporting plates 9 stacked below the device 1. It is preferred to have the stack of plates 9 on a table free to move vertically in a controlled manner so that the top plate 9 is always at the level of the gripping means 28 and, more precisely, at the level of the inclined plate 28a and pointed projection 28b.

Figure 3:
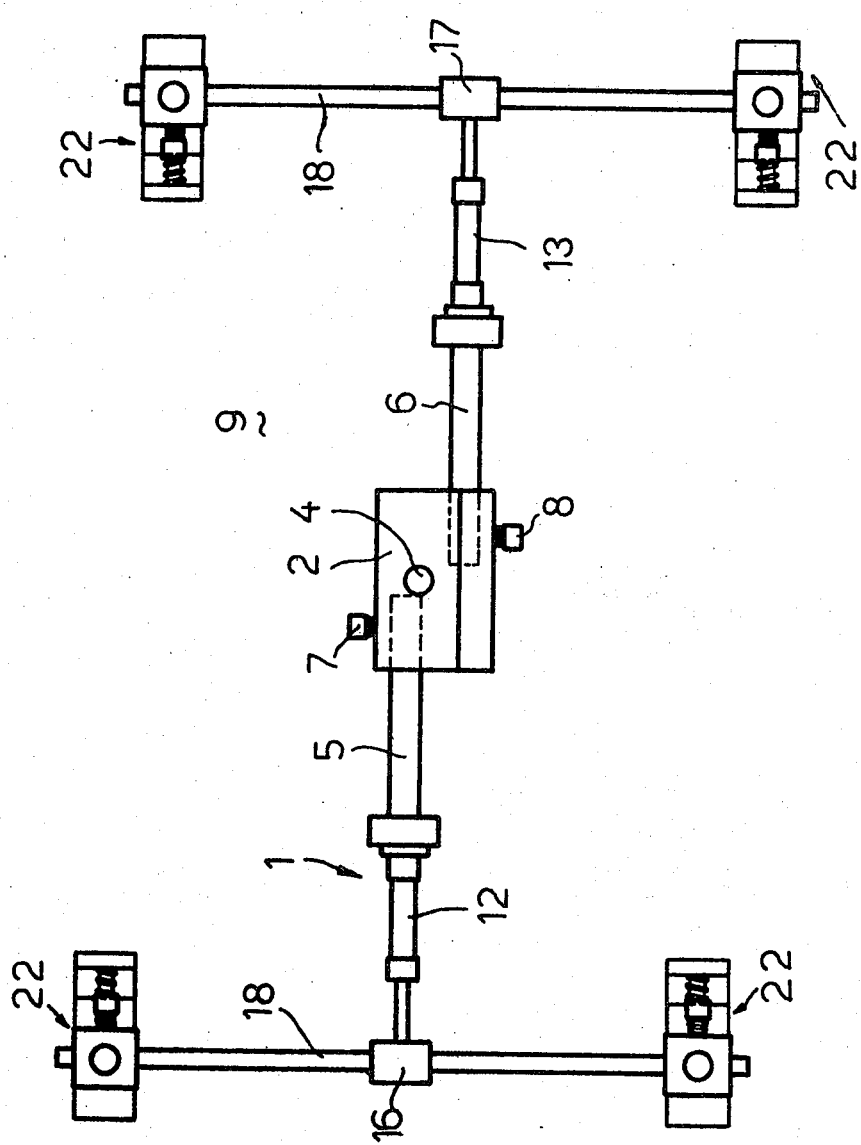
FIG. 3 shows the gripping group seen from above.

FIG. 3 shows again in a plan view the gripping device 1 and the detailed structuration of the gripping elements 22 as well as their position relative to the plate stack 9. To ensure the functioning of the device 1, the latter must be interlinked with two roller runways moving horizontally and being in turn interlinked with the parallel cross-ledgers. To make the construction still clearer, the FIGS. 1 to 3 do not show the roller runways, with the latter being shown in detail in FIGS. 4 and 5. FIG. 4 shows two roller runways which are parallel, horizontal and interlinked with the device 1; indicated are only the gripping units 22, while the various supports, pistons and braces are not shown for making the drawing clearer.

As already mentioned before, parallel to the cross-ledgers 18 and 19 are roller runways 32 and 33 with a line of rollers 36 are seated in the bodies 34 and 35 supported for example by the machine structure not shown. The said rollers 36 whose hubs are seated in the bodies 34, 35, are so driven as to move the supporting plate 9 in the direction of the arrow f.

Figure 6:
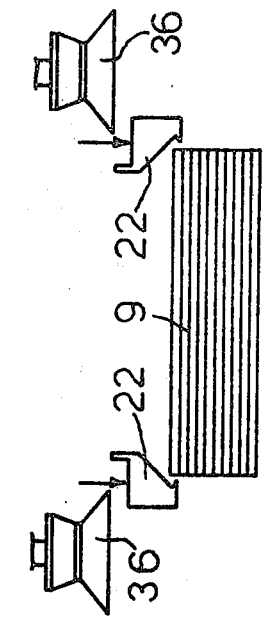

The rollers 36 are preferably shaped like two tapered trunks 36a and 36b connected at their narrower part, about at the level of the supporting plate 9. The bodies 32 and 33 are movable in horizontal direction and are provided with slots 37 for receiving the gripping elements 22 during the displacement of the roller groups 32, 33 in a horizontal plane as shown by the double arrows (g). To confer this movement to the roller runways 32, 33, the latter are pereferably connected with cylinder-piston units, for example of the pneumatic type and integrally connected to the machine frame. FIG. 5 shows a detail of a roller 36 with the inclined parts 36a and 36b. This particular shape of the roller ensures that the plates 9, when released by the gripping element 22, can be conveyed in direction (f) by the rollers 36 driven so that the plate 9 comes into contact with the roller 36 only with lower edge resting against the inclined plane 36b, or with the upper edge contacting the inclined part 36a. The functioning of the device 1, 32, 33 conceived according to this invention, shall now be illustrated by a sequence of movement schematically shown in FIGS. 6 to 12. In FIG. 6, the gripping elements 22 are positioned over the stack of piles, with the rollers 36 of the runways 32, 33 being at maximum distance from another. When engaging now the cylinder-piston unit 3, 4, all the elements 22 move downward to the stack of plates 9 with the inclined parts 28b contacting the upper parallel edges of the top plate 9.

Thanks to the possibility of moving elastically in vertical direction (guiding rod 24 and spring 26), the contact between the inclined planes 28a and the upper edges of the top plate 9 is made in a smooth and safe manner, considering that the controlled vertical movement allows to compensate possible irregularities of the plate 9 relative to the horizontal plane.

Figure 7:
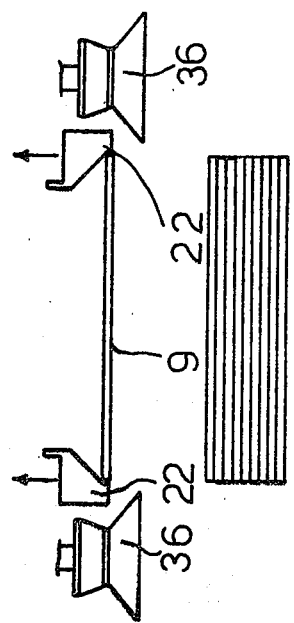
Figure 8:
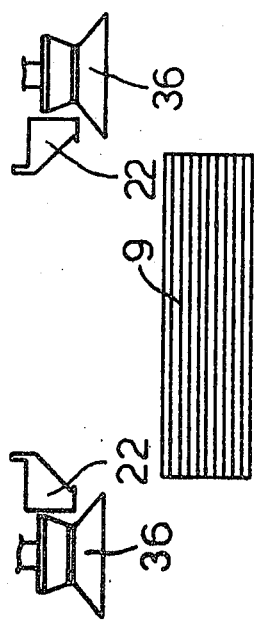

After the gripping elements 22, as shown in FIG. 7, have contacted with their inclined planes 28b the upper edges of the top supporting plate 9, the cylinder-piston units 12, 14, and 13, 15 are engaged to allow them to move the gripping elements 22 toward the brace 2 integral part of the cylinder-piston units 3, 4, thereby bringing the pointed projection 28b, as shown in FIG. 8, into contact with the vertical, parallel edges of the top plate 9. Also in this case it is preferable that each gripping element can follow an elastic movement in horizontal direction as ensured by the presence of the dovetailed guide 27 of the guide rod 30, as well as by the pressure spring 31 provided between the support 23 and the projection 29 of the gripping body 28. Thanks to this resilient support the top plate 9 is gripped by the pointed projection 28b, also when the plates are not perfectly square and have an irregular perimeter. When the top plate 9 has been gripped by the gripping elements 22 as shown in FIG. 8, the cylinder-piston unit 3, 4 is again engaged for lifting the plate as shown in FIG. 9 to a level corresponding approximately to the groove of the rollers 36 formed between the tapered trunks 36a and 36b.

Figure 9:
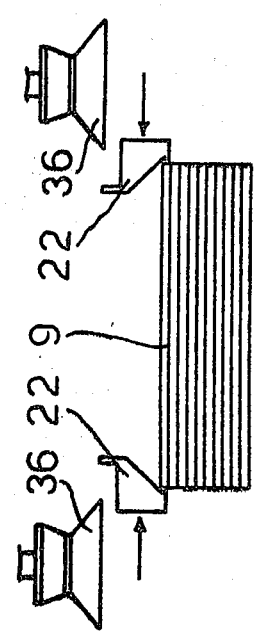

After the position shown in FIG. 9 has been reached, also the runways 32, 33 are moved horizontally toward the plate 9, locked between the gripping elements 22, with the said elements 22 thus being allowed to penetrate into the suitable slots 37 provided in the bodies 34, 35 as shown schematically in FIG. 4. Thereafter, the cylinder-piston units 12, 13 and 14, 15 are again engaged and slightly distance the gripping elements 22 from another as shown in FIG. 11, thus releasing the previously locked supporting plate 9 and delivering it to the lower inclined plane 36b of the rollers 36 which are driven and convey the supporting plate 9 toward the feeding means interlinked with a suitable laminating machine not shown to be provided downstream of the roller runways 32, 33. Thereafter, also the roller runways 32, 33 are again spaced apart as shown in FIG. 12 releasing fully the panel 9 which, now, is conveyed and handled by other means.

It results from the above that, with the described means, it is for the first time possible to grip automatically and with the required safety and gentleness supporting panels for printed circuits to be supplied to a calibrator device with touching and thereby damaging the said plates 9.

FIG. 13 shows, enlarged, the particular embodiment of the gripping elements 22 which, when moving downward, contacts first the upper edge of top panel 9 by leaning with its inclined plane 28b against the edge of the panel and then, with the gripping elements moving horizontally, locking the panel 9 along its vertical edge by means of the pointed projection 28b.

This particular shape of the gripping elements 22 ensures a special combination between geometrical and dynamic coupling of the panel 9 by means of the single gripping elements 22, so that it becomes possible to securely lift the panel 9 for conveying it over the aforedescribed roller runways which are horizontally movable, to the subsequent in-line laminating machine for applying the photosensitive film to the panel surface without needing any labour and without having to touch the panel surface. It is obvious that this device according to this invention allows to considerably reduce the sizes of the climatized ambients for the panel stacks to be transferred and that these ambients can be completely encased for example.

What I claim is:

1. A loader for automatically supplying a base plate for a printed circuit to a laminating machine, comprising
a brace locatable over a stack of plates;
vertical means for moving said brace vertically toward and away from the stack;
two adjustable guiding rods extending in parallel and horizontally from said brace, said guiding rods having cylinder-piston units at ends thereof remote from said brace;
parallel and horizontal cross rods coupled to said cylinder-piston units at ends thereof remote from said guiding rods;
adjustable and movable gripping elements coupled to said cross rods; and
a driven roller runway parallel to each of said cross rods, and movable between a rest position permitting a plate to pass freely between said runways and an operational position engaging the plate previously engaged by said gripping element.

2. A loader according to claim 1 wherein said gripping elements comprise means for engaging two parallel sides of a plate to be transferred.

3. A loader according to claim 1 wherein each of said gripping elements is supported on one of said cross rods by a horizontal and vertical guide means with spring means for biasing the respective gripping element against a plate being engaged thereby.

4. A loader according to claim 1 wherein each of said gripping elements has an inclined planar surface and a pointed projection on a lower end of said inclined planar surface, whereby said inclined planar surface initial engages an upper edge of the plate being gripped and said pointed projection engages the plate intermediate upper and lower edges thereof.

5. A loader according to claim 1 wherein said brace comprises a supporting body; and said vertical means comprises a fluid actuated piston-cylinder unit fixed at one end thereof to a machine frame for the loader.

6. A loader according to claim 1 wherein said brace comprises a supporting body having horizontal and parallel holes adjustably receiving said guiding rods and having screws for locking said guiding rods in a desired position in said supporting body.

7. A loader according to claim 1 wherein said guiding rods have thickenings at ends thereof remote from said brace for receiving flanges of said cylinder-piston units; and said cylinder-piston units have rods with thickenings at free ends thereof receiving and supporting said cross rods.

8. A loader according to claim 1 wherein supports couple said gripping elements to said cross rods, said supports adjustably receiving said cross rods and having screws for locking said supports in desired positions on said cross rods.

9. A loader according to claim 1 wherein supports couple said gripping elements to said cross rods, each of said supports comprising a vertical sleeve slidably receiving a vertical stem fixed to said gripping element and a spring biasing each of said supports from the respective gripping element.

10. A loader according to claim 1 wherein each of said gripping elements comprise a horizontal supporting plate, a vertical member coupled to said supporting plate by a horizontal dovetail coupling permitting horizontal sliding movement therebetween, and spring means for biasing said supporting plate relative to said vertical member; and said vertical member has an inclined planar surface for engaging an upper edge of the plate being gripped.

11. A loader according to claim 1 wherein said driven roller runways are movable in a horizontal plane and receive said gripping elements.

12. A loader according to claim 1 wherein said driven roller runway comprise a plurality of rollers, each of said rollers having first and second frustoconical portions connected at smaller ends thereof.

13. A loader according to claim 1 wherein said driven roller runways have slots adjacent said gripping elements for receiving said gripping elements inside said driven roller runways.

* * * * *